US007949649B2

(12) United States Patent
Whitman (10) Patent No.: US 7,949,649 B2
(45) Date of Patent: May 24, 2011

(54) AUTOMATICALLY ACQUIRING ACOUSTIC AND CULTURAL INFORMATION ABOUT MUSIC

(75) Inventor: Brian Whitman, Somerville, MA (US)

(73) Assignee: The Echo Nest Corporation, Somerville, MA (US)

(*) Notice: Subject to any disclaimer, the term of this patent is extended or adjusted under 35 U.S.C. 154(b) by 444 days.

(21) Appl. No.: 12/100,966

(22) Filed: Apr. 10, 2008

(65) Prior Publication Data
US 2008/0256042 A1    Oct. 16, 2008

Related U.S. Application Data

(60) Provisional application No. 60/922,604, filed on Apr. 10, 2007.

(51) Int. Cl.
*G06F 7/00* (2006.01)
*G06F 17/30* (2006.01)
(52) U.S. Cl. ............ 707/710; 707/802; 707/913; 700/94
(58) Field of Classification Search .................. 707/709, 707/710, 802, 913, 999.107; 700/94
See application file for complete search history.

(56) References Cited

U.S. PATENT DOCUMENTS

| 5,918,223 | A | 6/1999 | Blum | |
|---|---|---|---|---|
| 6,539,395 | B1 | 3/2003 | Gjerdingen | |
| 6,801,906 | B1* | 10/2004 | Bates et al. | 707/707 |
| 6,865,173 | B1* | 3/2005 | Czaja et al. | 370/342 |
| 7,013,301 | B2* | 3/2006 | Holm et al. | 707/741 |
| 7,075,000 | B2 | 7/2006 | Gang et al. | |
| 7,081,579 | B2 | 7/2006 | Alcalde et al. | |
| 7,193,148 | B2 | 3/2007 | Cremer | |
| 7,273,978 | B2 | 9/2007 | Uhle | |
| 7,277,766 | B1* | 10/2007 | Khan et al. | 700/94 |
| 2002/0002899 | A1 | 1/2002 | Gjerdingen | |
| 2002/0181711 | A1* | 12/2002 | Logan et al. | 381/1 |
| 2003/0086341 | A1 | 5/2003 | Wells et al. | |
| 2004/0199491 | A1* | 10/2004 | Bhatt | 707/2 |
| 2004/0231498 | A1 | 11/2004 | Li et al. | |
| 2005/0289600 | A1* | 12/2005 | Kawahara et al. | 725/53 |
| 2006/0065102 | A1 | 3/2006 | Xu | |
| 2006/0149552 | A1* | 7/2006 | Bogdanov | 704/273 |
| 2007/0043768 | A1* | 2/2007 | Kang et al. | 707/104.1 |
| 2007/0094215 | A1* | 4/2007 | Toms et al. | 706/52 |
| 2007/0106405 | A1* | 5/2007 | Cook et al. | 700/94 |
| 2007/0150515 | A1* | 6/2007 | Brave et al. | 707/104.1 |
| 2007/0256093 | A1* | 11/2007 | Hiler | 725/28 |
| 2008/0018503 | A1* | 1/2008 | Kim et al. | 341/50 |
| 2008/0189330 | A1* | 8/2008 | Hoos et al. | 707/104.1 |

OTHER PUBLICATIONS

Unknown, Sounds Good?, magazine, Jun. 2006, 1 page.
Unknown, Open Fingerprint Implementation Whitepaper Version 8.0, Journal, Mar. 12, 2006, http://creativecommons.org/licenses/by-nc-sa/2.5/, 9 pages.

(Continued)

*Primary Examiner* — John Breene
*Assistant Examiner* — Phong Nguyen
(74) *Attorney, Agent, or Firm* — SoCal IP Law Group LLP; Steven C. Sereboff; John E. Gunther (57) ABSTRACT

There are disclosed methods, apparatus, and storage media for building a music metadata library. Acoustic metadata for one or more music tracks may be automatically acquired from a plurality of client computing devices. Cultural metadata for the one or more music tracks may be automatically acquired by searching Internet-accessible content. The acquired acoustic and cultural metadata may be stored in the music metadata library.

22 Claims, 7 Drawing Sheets

OTHER PUBLICATIONS

Ellis, Daniel P.W., et al. The Quest for Ground Truth in Musical Artist Similarity, Proceedings of IRCAM (Instutite for Music/Acoustic Research and Coordination), 2002, Centre Pompidou, Paris France.

Berenzweig, Adam et al., A Large-Scale Evaluation of Acoustic and Subjective Music Similarity Measures, Proceedings of ISMIR (International Conference on Music Information Retrieval), 2003, Johns Hopkins University, Baltimore, MD.

Recht, Ben and Whitman, Brian, Musically Expressive Sound Textures fro Generalized Audio, Proc. of the 6th Int. Conference on Digital Audio Effects (DAFx-03), Sep. 8-11, 2003, London, UK.

Whitman, Brian and Lawrence, Steve, Inferring Descriptions and Similarity for Music from Community Metadata, Proceedings of the 2002 International Computer Music Conference, Gothenburg, Sweden.

Whitman, Brian and Rifkin, Ryan, Musical Query-by-Description as a Multiclass Learning Problem, 2002 IEEE Workshop on Multimedia Signal Processing, Dec. 9-11, 2002, pp. 156-156.

Whitman, Brian, et al. Learning Word Meanings and Descriptive Parameter Spaces from Music, Proceedings of the HLT-NAACL (Human Language Technology Conference) 2003 Workshop on Learning Word Meaning From Non-Linguistic Data, vol. 6, pp. 92-99.

Whitman, Brian, Semantic Rank Reduction of Music Audio, Proceedings of 2003 IEEE Workshop on Appplicatins of Signal Processing to Audio and Acoustics, Oct. 19-22, 2003, New Paltz, NY.

Whitman, Brian, and Ellis, Daniel P.W., Automatic Record Reviews, Proceedings of the 2004 International Symposium on Music Information Retrieval at Universitat Pompeu Fabra, Barcelona, Spain.

\* cited by examiner

AUTOMATICALLY ACQUIRING ACOUSTIC AND CULTURAL INFORMATION ABOUT MUSIC

RELATED APPLICATION INFORMATION

This patent claims benefit of the filing date of provisional patent application Ser. No. 60/922,604, filed Apr. 10, 2007, entitled "Automatically Acquiring Acoustic and Cultural Information About Music".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to methods for acquiring and storing information about music.

2. Description of the Related Art

Current music analysis, personalization, and recommendation systems rely on descriptive metadata describing each song or track. The metadata may be stored in a database and processed to identify, recommend, and/or retrieve similar songs. Present systems may rely on either acoustic metadata or on cultural metadata. Present systems may use collaborative filtering of metadata concerning playback or sales statistics about the track.

Within this patent, "acoustic metadata" refers to a numerical or mathematical representation of the sound of a track. Acoustic metadata may take the form of one or more vectors, matrices, lists, tables, and other data structures. Acoustic metadata may be derived from analysis of the music signal. One form of acoustic metadata, commonly termed an "acoustic fingerprint", may uniquely identify a specific track. Other forms of acoustic metadata may be formed by compressing the content of a track while retaining some or all of its musical characteristics. Acoustic metadata may include both temporal information such as tempo, rhythm, beats, tatums, or structure, and spectral information such as melody, pitch, harmony, or timbre.

Techniques for deriving acoustic metadata from music signals are known. Since the music signal may be converted into one or more feature vectors, such techniques may be known as "music vectorization". For example, copending patent application Ser. No. 12/061,374, entitled "Method and Apparatus for Automatically Segueing Between Audio Tracks", filed Apr. 2, 2008, describes a method for deriving acoustic metadata wherein a track may be divided into segments and the spectral content of each segment may be compressed into a timbral vector. An acoustic fingerprint, termed a "timbral signature", may then be calculated as the covariance matrix of the timbral vectors. Paragraphs 0030-0035 and 0048-0051 as filed and the associated figures of application Ser. No. 12/061, 374 are incorporated herein by reference. Other methods for deriving acoustic metadata are described in U.S. Pat. Nos. 5,918,223, 7,013,301, and No. 7,277,766.

Within this patent, "cultural metadata" refers to text-based information describing listeners' reactions to a track or song. Cultural metadata may be derived from expert opinion such as music reviews or classification of music into genres. Cultural metadata may be derived from listeners through Web sites, chat rooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Published U.S. patent application US 2007/0240557 A1, the entire content of which is incorporated herein by reference, describes (paragraphs 0034-0041 and the associated figures) a method for extracting cultural metadata from text pages obtained by searching the Internet. U.S. Pat. No. 6,539,395 describes another method for accumulating cultural metadata. Cultural metadata may be obtained through metadata services such as All Media Group (AMG, a unit of Macrovision), Gracenote, and others.

Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

Within this patent, "explicit metadata" refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners. AMG and Gracenote provide explicit metadata (names, credits, product numbers, etc.) and cultural metadata (styles, genres, moods, themes, similar artists and/or songs, rankings, etc.) for a large library of songs or tracks. The metadata available from AMG's Allmusic.com Web site is believed to be generated primarily by a network of hundreds of professional music critics and reviewers.

MusicIP Corporation provides an acoustic fingerprinting service commonly referred to as Music DNS (Digital Naming System). Music DNS calculates acoustic metadata from the content of a track. Music DNS may be used to uniquely identify specific tracks.

Copending patent application Ser. No. 12/101,013, filed Apr. 10, 2008, entitled "Determining The Similarity of Music Using Cultural and Acoustic Information", the entire content of which is incorporated herein by reference, describes method of comparing music based on cultural and acoustic metadata.

Throughout this description, elements appearing in block diagram are assigned three-digit reference designators, where the most significant digit is the figure number and the two least significant digits are specific to the element. An element that is not described in conjunction with a block diagram chart may be presumed to have the same characteristics and function as a previously-described element having a reference designator with the same least significant digits.

Throughout this description, elements appearing in flow charts are assigned three-digit reference designators, where the most significant digit is the figure number and the two least significant digits are specific to the element. An element that is not described in conjunction with a flow chart may be presumed to have the same characteristics and function as a previously-described element having a reference designator with the same least significant digits.

DETAILED DESCRIPTION

Within this patent, the terms "automatically" and "automated" mean "without operator intervention". An automated task may be initiated by an operator, but an automated task, once initiated, proceeds to a conclusion without further user action.

Within this patent, the term "track" is used to describe a unit of audio content such as a song or a section, such as a movement, of a longer musical performance or recording. A track may be recorded and stored on a storage device such as a hard disc drive, and may be a component of a library of audio tracks. A track may be stored in an uncompressed format such as a WAV file, AIFF file, AU file or other uncompressed file format. A track may be stored in a compressed format such as an MP3 file, a WMA file, or other compressed file format. A track may be stored in any known or future audio file format.

Description of Apparatus

Figure 1:
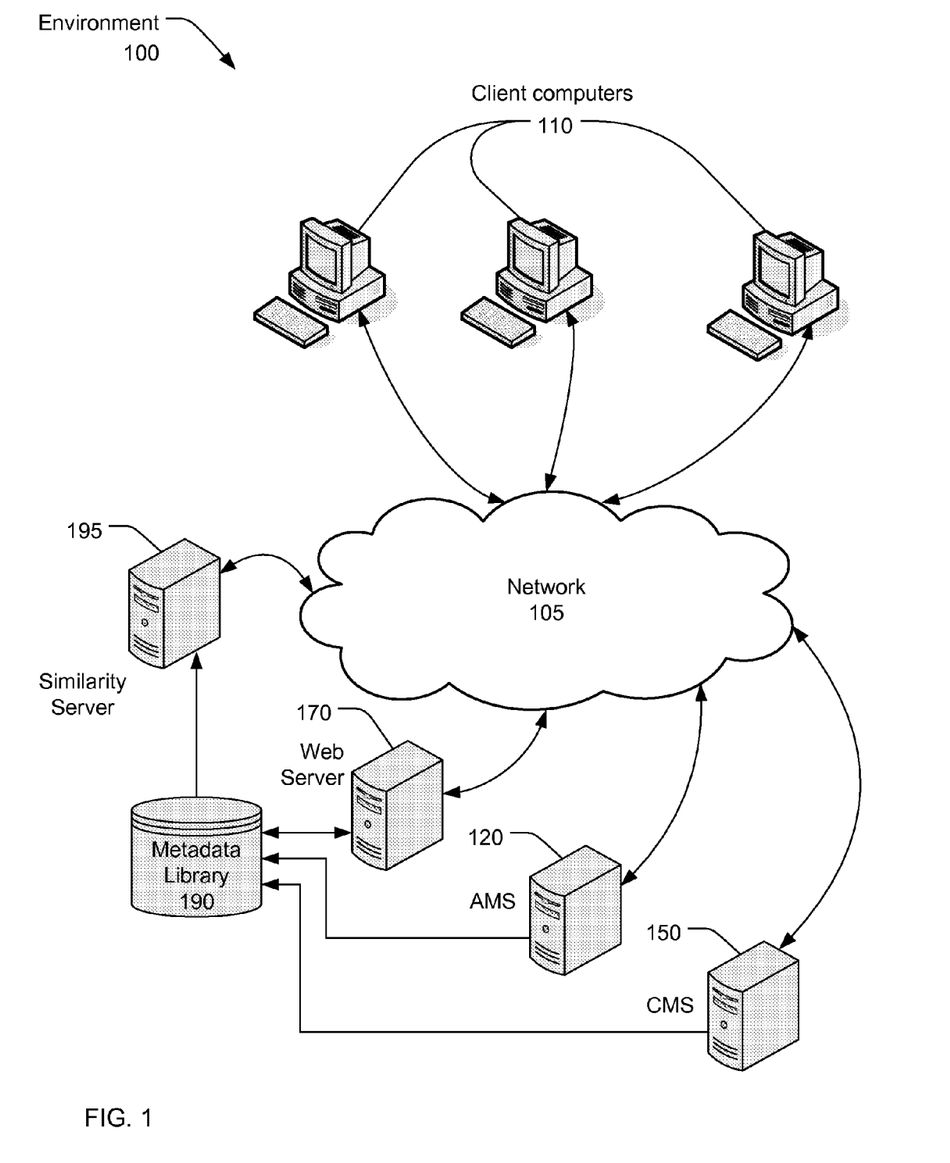
FIG. 1 is a block diagram of an environment in which the methods for acquiring cultural and acoustic information about music may be implemented.

Referring now to FIG. 1, an environment 100 may include a plurality of client computers 110, an acoustic metadata server (AMS) 120, a cultural metadata server (CMS) 150, a web server 170, and a similarity server 195 in mutual communications by way of a network 105. A metadata library 190 may be coupled to the web server 170, the AMS 120, the CMS 150, and the similarity server 195 by dedicated links and/or by a private network. The metadata library 190 may also be coupled to and accessible through the network 105.

Each of the clients 110 may be a computing device operated by a user (not shown). Each user may be a visitor to a music-related web site, a customer of an Internet music distribution site such as iTunes, a subscriber to a web-based music review and/or recommendation service, or other user. A computing device as used herein refers to any device with a processor and memory that may execute instructions. Computing devices include, but are not limited to, personal computers, server computers, portable computers, laptop computers, computing tablets, set top boxes, audio/video receivers, video game systems, personal video players, personal music players, personal digital assistants (PDAs), cellular telephones, and e-mail clients. These computing devices may run one or more application programs and may run an operating system, including, for example, versions of the Linux, Unix, MS-DOS, Microsoft Windows, Palm OS, Solaris, Symbian, and Apple Mac OS X operating systems.

Each client 110 may include a wired or wireless interface to the network 105. The network 105 may be the Internet or another public or private wide area network or local area network or combination thereof.

Each of the AMS 120, the CMS 150, the Web server 170, and the similarity server 195 may be one or more computing devices as previously defined. The functions of one or more of the AMS 120, the CMS 150, the Web server 170, and the similarity server 195 may be integrated into a single computing device. The functions of each of the AMS 120, the CMS 150, the Web server 170, and the similarity server 195 may be distributed across multiple computing devices.

The metadata library 190 may include one or more storage devices (not shown). As used herein, a storage device is a device that allows for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media. The metadata library 190 may also include a storage server (not shown) or other computing devices.

The metadata library 190 may store acoustic, cultural, and/or explicit metadata for a large plurality of tracks. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

The AMS 120 may include hardware, firmware, and software to automatically acquire acoustic metadata and explicit metadata via the network 105. The acoustic and explicit metadata acquired by the AMS 120 may be stored in the metadata library 190.

The CMS 150 may include hardware, firmware, and software to automatically acquire cultural metadata via the network 105. The cultural metadata acquired by the CMS 150 may be stored in the metadata library 190.

The web server 170 may include hardware, firmware, and software to provide a web site that offers music analysis, personalization, recommendation, and/or sales. The web server 130 may interact with one or more of the clients 110 via the network 105. The Web server 170 may retrieve acoustic, cultural, and/or explicit metadata from the metadata library 190. The Web server 170 may use acoustic, cultural, and/or explicit metadata to form content pages to be sent to a client via the network 105. The content pages may include information about music, tracks, albums, artists and the like. The content pages may also allow users to enter explicit metadata relating to music. The Web server may receive the explicit metadata from clients 110 via the network 105. The explicit metadata received from clients 110 may be combined with known explicit metadata and may be stored in the metadata library 190.

The similarity server 195 may include hardware, firmware, and software to perform a variety of music-related tasks including determining the similarly between a first music collection and a second music collection. The web server 170 or one of the clients 110 may place a request to the similarity server 195 that specifies the first music collection and the second music collection and instructs the similarity server 195 to determine the difference between the music collections. In response to the request, the similarity server 195 may analyze the first music collection and the second music collection, and provide a similarity score to the requester.

The web server 170 or one of the clients 110 may place a request to the similarity server 195 that specifies a first music collection and instructs the similarity server 195 to identify one or more additional tracks similar to the first music collection. In response to the request, the similarity server 195 may analyze the first music collection, identify one or more similar tracks, and provide a list of the similar tracks with corresponding similarity scores to the requester.

Further action may be taken by the similarity server and/or the requestor based on the similarity scores. For example, the web server 170 may recommend that a user add or not add a specific track or album to a music collection or a playlist based on a similarity score provided by the similarity server. Copending patent application Ser. No. 12/101,013, previously incorporated herein by reference, describes methods and systems for comparing music based on cultural and acoustic metadata.

Figure 2:
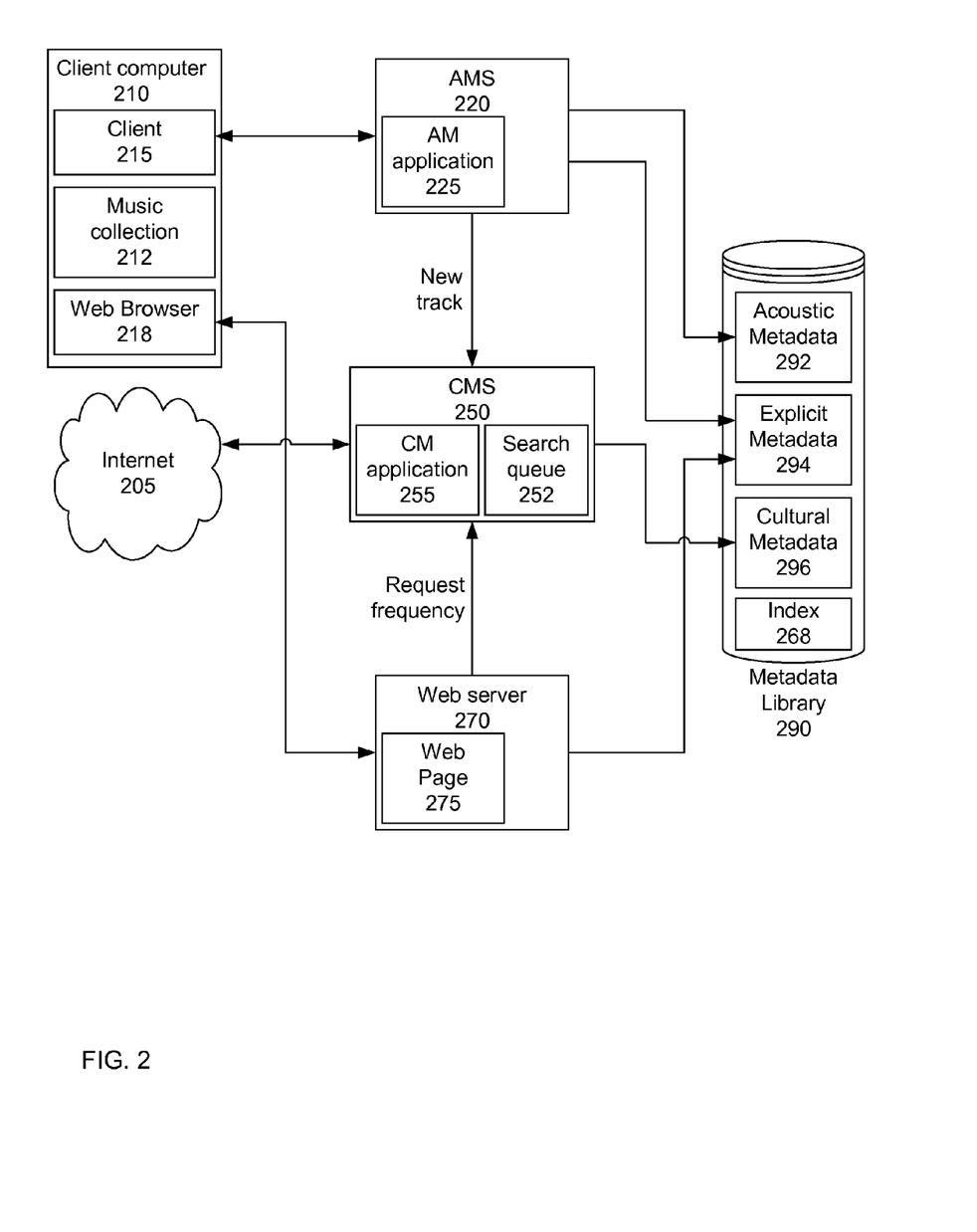
FIG. 2 is a block diagram of a system for acquiring acoustic, cultural and explicit metadata.

Referring now to FIG. 2, a system for acquiring acoustic, cultural and explicit metadata may include one or more client computers 210, an AMS 220, a CMS 250, a Web server 270 and a metadata library 290.

The client computer 210, which may be one of the client computers 110, may store a user's music collection 212. The music collection may be stored as a plurality of data files representing individual tracks. The music collection may also include explicit metadata associated with each track. The explicit metadata may include, for example, the track and album titles, the artist, the duration, and other information. The music collection may also store acoustic metadata associated with some or all of the tracks. The acoustic metadata may be stored as a separate file associated with each track. The acoustic metadata may be stored as XML files or in some other file format.

The client computer 210 may run software applications including a Web browser 218 and a client application 215. The Web browser 218 may be a version of Internet Explorer, Firefox, or other browser. The client application 215 may operate to extract acoustic metadata from the user's music collection 212. The client application 215 may operate to transmit acoustic and explicit metadata to the AMS 220, and to receive acoustic metadata from the AMS 220. The client application 215 may operate to store the extracted or received acoustic metadata within the client computer 210.

The AMS 220, which may be the AMS 120, may run an acoustic metadata application 225. The acoustic metadata application 225 may cause the AMS 220 to receive acoustic and explicit metadata from one or more client computers 210. The AMS 220 may process the received metadata and may cause the received metadata to be stored in the metadata library 290. The AMS 220 may also retrieve stored acoustic metadata from the metadata library 290 and may send the retrieved metadata to the client computer 210. The AMS 220 may notify the CMS 250 when a new track, album or artist is encountered in the metadata received from a client computer 210. The AMS 220 may also send explicit metadata related to the new track to the CMS 250.

The CMS 250, which may be the CMS 150, may run a cultural metadata application 255. The cultural metadata application 255 may cause the CMS 250 to extract and/or obtain cultural metadata from information available through the Internet 205. The CMS 250 may search the Internet using search terms stored in a search queue 252. The search terms may be, for example, track titles, album titles, artist names, or combinations thereof. The search terms may be, or may be derived from, explicit metadata received from the AMS 220 or some other source. For example, each search term may be the combination of an album title and the corresponding artist's name. The search queue 252 may contain a list of all of the search terms to be searched. The search queue 252 may contain a search schedule indicating when or how often each of the search terms should be searched.

The CMS 250 may download documents from Web sites, chat rooms, blogs and other Internet-accessible content sources identified in the results of each search. The results from each search may be compressed into cultural metadata associated with each search term. The CMS 250 may store the cultural metadata in the metadata library 290. For example, the cultural metadata application 255 may maintain a list of predetermined salient terms, and may identify the usage of the salient terms in the downloaded documents. The result of a search for a particular search term may be expressed as a description vector associated with that search term. The number of elements in the description vector may be the same as the number of predetermined salient terms. Each element of the description vector may indicate the probability that a corresponding salient term may be used to describe the associated search term, which may be a track title, album title, artist name, artist-album combination, or other search term.

The CMS 250 may receive notification and explicit metadata from the AMS 220 whenever a new track, album or artist is encountered in the metadata received from a client computer 210. The CMS 250 may then create one or more new search terms for the newly identified track, album, or artist and place the new search terms in the search queue. The new search terms may be scheduled for immediate search. The CMS 250 may also receive data from the Web server 270, to be discussed subsequently, indicating the frequency at which requests relating to specific tracks, albums, and/or artists are received from users. The CMS may use the request frequency data to modify the search schedules within the search queue 252.

The Web server 270, which may be the Web server 170, may run a Web page application 275. The Web page application 275 may cause the Web server 270 to generate a site on the World Wide Web that may be accessed by the client computer 210 via the client's Web browser 218. The Web server 270 may respond to requests received from the client computer 210 by providing Web pages containing information requested by the client computer. The information contained in the Web pages may include explicit metadata, cultural metadata, and/or acoustic metadata retrieved from the metadata library 290. Web pages generated by the Web server 270 may also allow a user to edit and/or add explicit metadata. Edited or added explicit metadata may be received by the Web server 270 and added to the explicit metadata already stored in the metadata library 290.

The Web server 270 may accumulate data on the frequency that clients request data on various tracks, albums, artists, and the like. The Web server 270 may provide the request frequency data to the CMS 250. The CMS 250 may use the request frequency data to adjust the rate at which searches based on various search terms are performed. Searches may be performed more frequently for popular search terms and less frequently for less popular or unpopular search terms. For example, in response to the Web server receiving a high number of requests for information on a specific album, the CMS may decrease the period between successive searches based on that album title to ensure that the cultural metadata acquired by the CMS reflects the latest available information. In contrast, in the absence of any requests for information about a particular artist, the CMS may delay or suspend searching for additional information about that artist.

Figure 3:
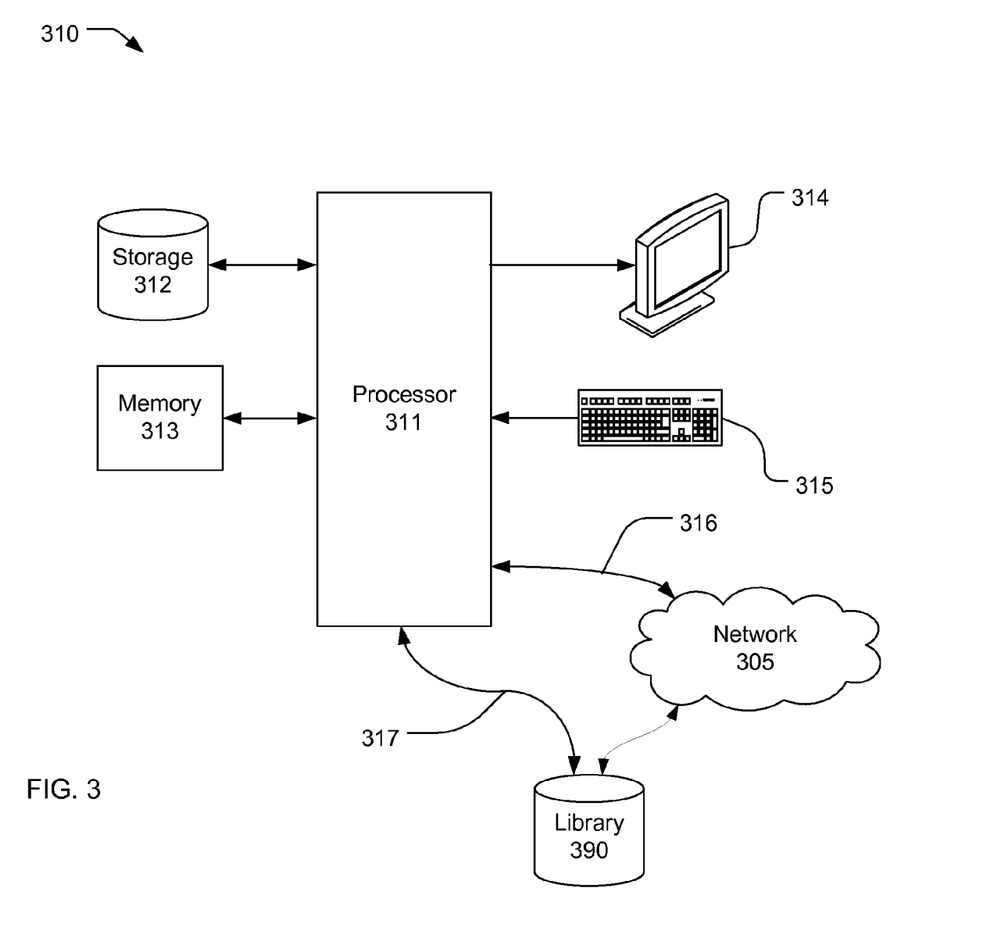
FIG. 3 is a block diagram of a computing device in which the methods for acquiring cultural and acoustic information about music may be implemented.

FIG. 3 is a block diagram of a computing device 310 that may be suitable for the client 110. The computing device 310 may also be suitable for the AMS 120, the CMS 150, the Web server 170, and the similarity server 195. The computing device 310 may include hardware, firmware, and/or software adapted to perform the processes subsequently described herein. The computing device may include a processor 311 coupled to memory 313 and a storage device 312.

The computing device 310 may include or interface with a display device 314 and one or more input devices such a keyboard 315. The computing device 310 may also interface with one or more networks 305. The interface 316 between the computing device 310 and the network 305 may be wired or wireless. The network 305 may be the Internet or any other private or public network.

When used as a client, such as the clients 110, the computing device 310 may also interface with an audio input device (not shown) such as a compact disc player and with an audio output device (not shown) which may include a multi-channel amplifier and speakers. The computing device 310 may store an individual user's music collection and may also store metadata associated with the individual user's music collection.

The computing device 310 may be coupled to or include a metadata library 390 by a dedicated link 317 or via the interface 316 and the network 305. The library 390 may store acoustic, cultural, and/or explicit metadata associated with a large plurality of audio tracks as previously described. The computing device 310 may retrieve metadata from the metadata library 390 to perform the processes subsequently described herein.

The processes, functionality and features of the computing device 310 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 310 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 311 and others by other devices.

Description of Processes

Figure 4:
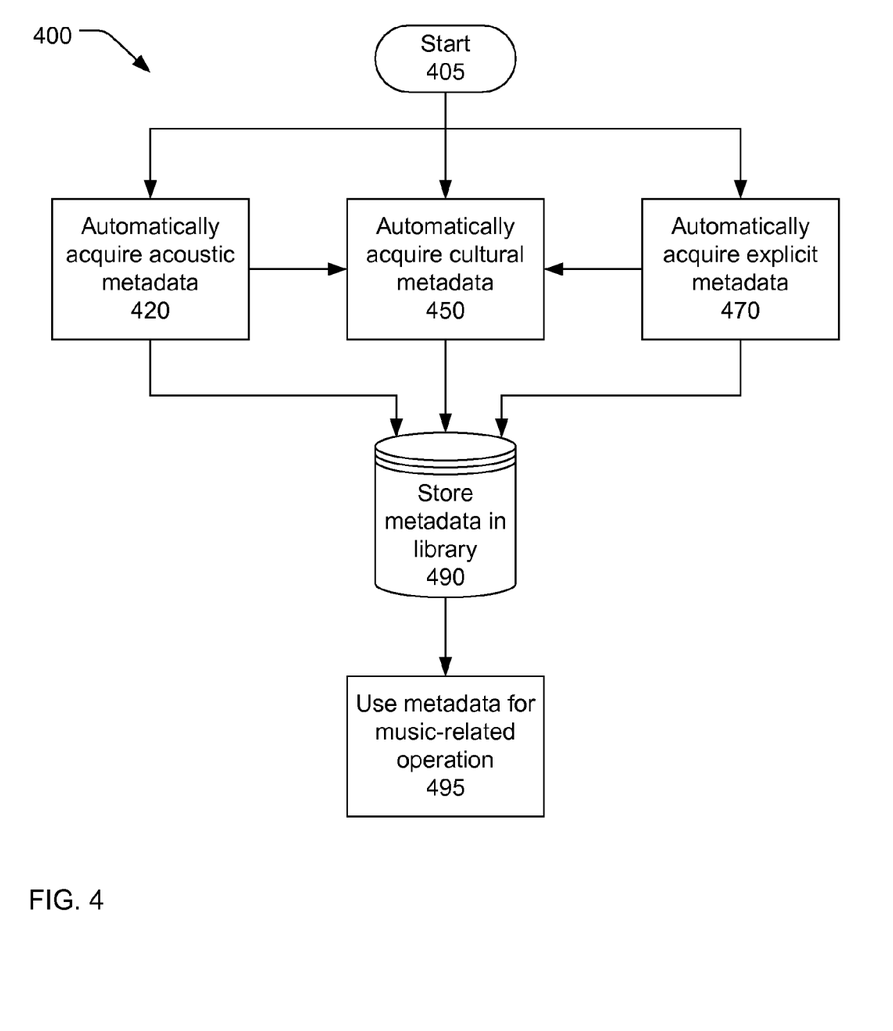
FIG. 4 is a flow chart of a process for acquiring and using music-related metadata.

Referring now to FIG. 4, a process 400 for acquiring and using music-related metadata may have a start at 405. The process 400 may not have an end since the acquisition of music related metadata may be automatic and perpetual.

At 420, acoustic metadata may be automatically acquired. For example, acoustic metadata may be automatically acquired by an acoustic metadata server such as the AMS 120 or 220. Explicit metadata may also be acquired at 420. Acoustic and explicit metadata may be received from a plurality of clients that analyze a corresponding plurality of users' music collections to extract the acoustic and/or explicit metadata. An exemplary process for acquiring acoustic and explicit metadata will be described subsequently. The acquisition of acoustic metadata at 420 may begin as soon as the client application is installed on a first user's computing device.

At 450, cultural metadata may be automatically acquired. For example, cultural metadata may be automatically acquired by a cultural metadata server such as the CMS 150 or 250. Cultural metadata may be acquired by searching for music-related Internet-accessible content. An exemplary process for acquiring cultural metadata will be described subsequently. The acquisition of cultural metadata at 450 may be started with an initial list of search terms. The acquisition of cultural metadata at 450 may be based on a list of search terms derived from explicit metadata acquired at 420 and/or 470.

At 470, explicit metadata may be acquired automatically or partially automatically. For example, explicit metadata may be automatically accumulated by a Web server such as the Web server 170 or 270. Explicit metadata may be acquired from users interacting with a music-related Web site or with a music-related web application such as iTunes or RealPlayer. An exemplary process for acquiring explicit metadata will be described subsequently. The acquisition of explicit metadata at 470 may start when the music-related web site is made operational.

At 490, the acquired acoustic, cultural, and explicit metadata may be stored in a library, such as the metadata library 190 or 290. The library may store acoustic, cultural, and/or explicit metadata for a plurality of tracks. Acoustic and cultural metadata may be stored in the form of parameters, lists, matrices, vectors, and other data structures. Acoustic and cultural metadata may be stored as XML files, for example, or any other appropriate file type. Explicit metadata may be stored in the form of numerical, text, pictorial, and other information. Explicit metadata may also be stored in an XML or other file. All or portions of the metadata may be stored in separate files associated with specific tracks. All or portions of the metadata, such as acoustic fingerprints and/or description vectors may be stored in a searchable data structure, such as a k-D tree or other database format.

At 495, all or portions of the stored metadata may be retrieved and used for a music-related operation. The retrieved metadata may be used, for example, for providing content for on-line or printed publications; for preparing music reviews that may be posted to websites or blogs, or distributed by e-mail; and for recommending music to users for inclusion in a music collection or playlist. As a further example, copending patent application Ser. No. 12/101,013, previously incorporated herein by reference, describes methods of comparing music based on cultural and acoustic metadata.

Figure 5:
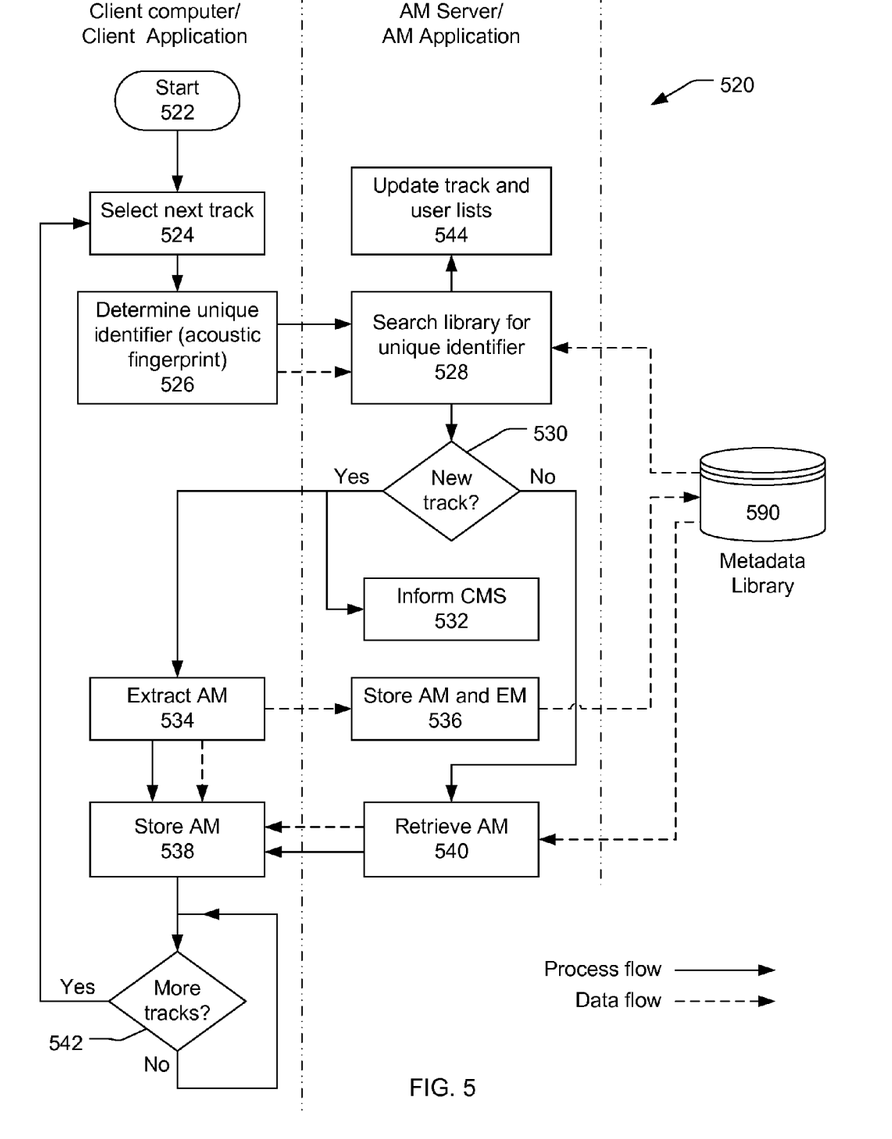
FIG. 5 is a flow chart of an exemplary process to automatically acquire acoustic metadata.

Referring now to FIG. 5, a process 520 for automatically acquiring acoustic metadata may be suitable for use at 420. The process 520 may be performed by a client computer running a client application, which may be the client computer 210 and client application 215, and a server running an acoustic metadata (AM) application, which may be the AMS 220 and the AM application 225.

The process 520 starts at 522 when the client application is installed on the client computer. The process 522 may not have an end since acoustic metadata may be acquired perpetually. It should be recognized that the process 520 may operate on a plurality of client computers concurrently. Each of the plurality of client computers will start the process 520 when the client application is installed. The starts of the plurality of client computers may be distributed in time.

At 524, a target track is selected from a user's music collection stored on the client computer. The user's music collection may be the music collection 212. At 526, a unique identifier may be determined for the target track. For example, the unique identifier may be an acoustic fingerprint calculated for the target track. Techniques for calculating acoustic fingerprints are described in copending application Ser. No. 12/061,374, previously incorporated herein by reference, and U.S. Pat. No. 7,013,301. Any other known or future technique for calculating an acoustic fingerprint may be used at 524. The unique identifier determined at 524 may be another known or future technique for uniquely tagging or identifying a track.

The unique identifier determined at 526 may be transmitted to the server via a network or other communications method. At 528, the server may compare the unique identifier of the target track to the contents of a database of similarly-determined unique identifiers for known tracks stored in a metadata library 590, which may be the metadata library 190 or 290. If the database contains a unique identifier that is a "close enough" match to the unique identifier of the target track, the target track is identified as a known track at 530. If the database does not contain a unique identifier that is identical or "close enough" to the unique identifier of the target track, the target track is identified as a new track at 530.

In this context, "close enough" is defined to mean similar within a predetermined amount according to a defined similarity measurement. A variety of similarity or comparison measurements are known. Any known similarity measurement may be used to compare the target acoustic fingerprint with the acoustic fingerprints stored in the database. For example, each acoustic fingerprint may be treated as a vector, and two acoustic fingerprints may be compared by calculating the Euclidean distance between the two vectors. Two acoustic fingerprints may be determined to be "close enough" if the Euclidean distance is less than a predetermined threshold. The predetermined threshold may be fixed, defined by the system, or settable by a user or administrator.

In the case where the target track is identified to be a new track at 530, explicit metadata identifying the new track may be sent to a cultural metadata server (CMS). The CMS may use this data to initiate a search for cultural metadata relating to the new track.

The client application, upon being informed by the server that the target track is a new track, may extract additional acoustic metadata from the target track at 534. The extracted acoustic metadata may include both temporal information such as tempo, rhythm, beats, tatums, or structure, and spectral information such as melody, pitch, harmony, or timbre. The acoustic metadata may be extracted at 534 using any known or future acoustic extraction technique. The acoustic metadata may be extracted at 534 using one or more acoustic metadata extraction techniques.

The extracted acoustic metadata and any available explicit metadata (track and album titles, artist name, etc.) may be sent from the client to the server. At 536, the server may cause the acoustic and explicit metadata to be stored in the metadata library 590. The extracted acoustic metadata may also be stored in the client computer at 538.

At 542, the client may determine if there are additional tracks in the user's music collection. If there are additional tracks, the process 520 may return to 524 where a next target track is selected. The process may repeat until every track in the user's music collection has been considered. When it is determined at 542 that there are no more tracks in the user's music collection, the process 520 may become idle, but continue to operate in the background until more tracks are added to the user's music collection.

When it is determined at 530 that a target track is a known track, the acoustic metadata for the known track may be retrieved from the metadata library 590 at 540. The retrieved acoustic metadata may be sent to the client and stored at the client at 538. The process 520 may then continue from 538 as previously described.

The AM server may maintain lists, by user, of the tracks in each user's music collection. The AM server may also maintain lists of the number of times that each track, album, and/or artist appears in any user's music collection. These lists may be updated at 544 each time a target track is identified. These lists may be stored within the AM server or within the metadata library 590 or on other local or remote computing devices and/or storage devices.

Figure 6:
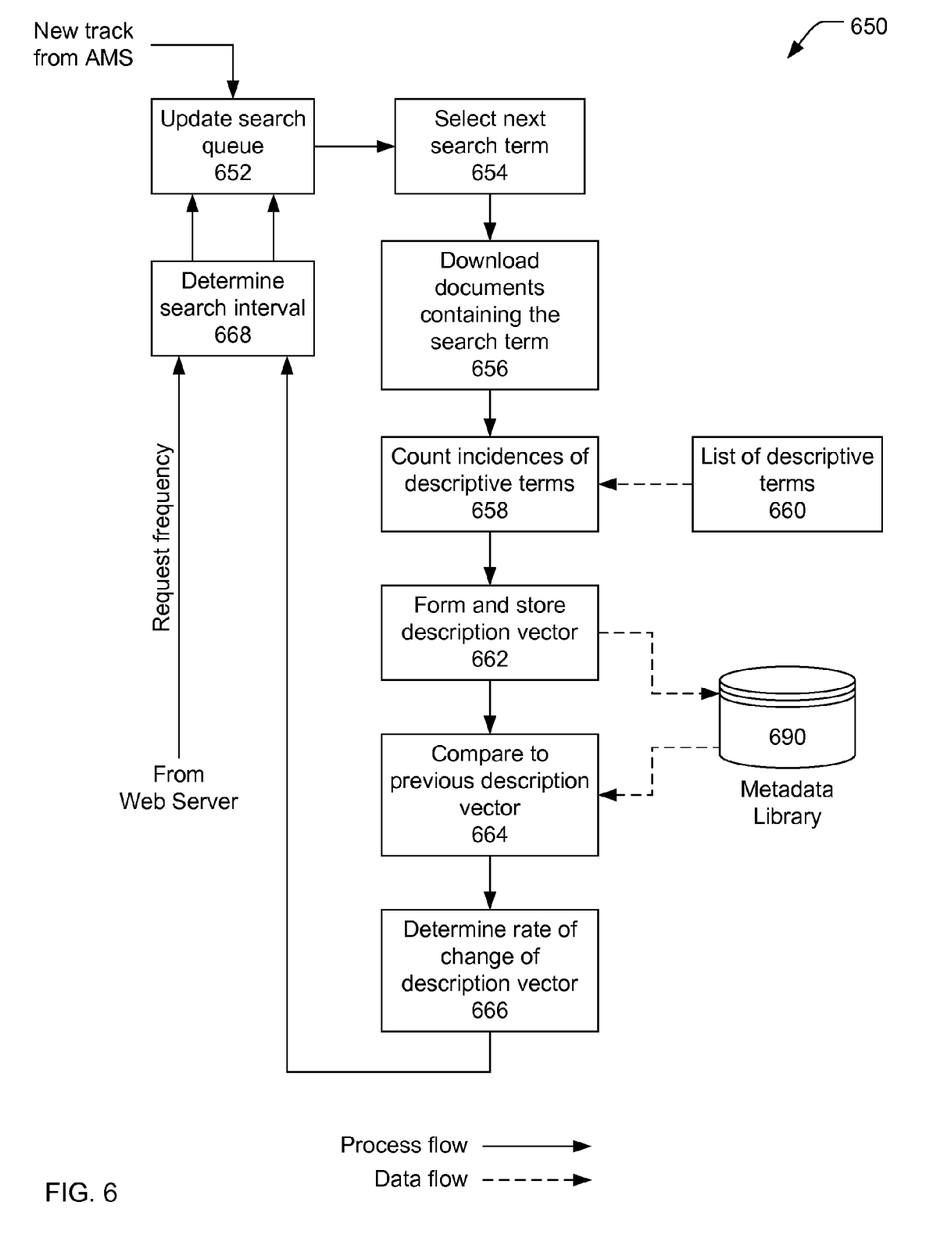
FIG. 6 is a flow chart of an exemplary process to automatically acquire cultural metadata.

Referring now to FIG. 6, a process for automatically acquiring cultural metadata 650 may be suitable for use at 450. The process 650 may be performed by a server having access to the Internet and running a cultural metadata application, which may be the CMS 250 and the CM application 255. The process 650 may not have a start or end, since the acquisition of cultural metadata may be perpetual.

The process 650 may acquire cultural metadata by searching Web sites, chat rooms, blogs, and other Internet-accessible content using search terms stored in a search queue. The search terms may be, for example, track titles, album titles, artist names, or combinations thereof. The search queue may contain a list of all of the search terms to be searched. The search queue may also contain a search repetition interval associated with each search term. The search repetition interval may indicate when or how often a search of each search term should be repeated. For example, the search repetition interval may be one day, two days, one week, one month or another time interval.

At 654, a next search term may be selected from the search queue. The Internet may then be searched, and documents containing the selected search term may be downloaded at 656. The downloaded documents may include Web pages, chat room and blog postings, documents available from public ftp folders, and other Internet-accessible content.

At 658, the content of the downloaded documents may be scanned and the incidences of words and phrases from a predetermined list of descriptive terms 660 may be identified and counted. The predetermined list of descriptive terms 660 may include terms related to the mood, tone, style, genre, and/or feeling of music and other terms salient to the comparison and/or evaluation of music. The predetermined list of descriptive terms 660 may include terms that were previously determined to be salient to music evaluation and comparison. Copending published Patent Application US2007/0240557A1 describes methods for selecting salient terms and for forming description vectors. Paragraphs 0034-0040 and 0053-0060 and the associated figures of US US2007/0240557A1 are incorporated herein by reference.

At 662, cultural metadata in the form of a description vector reflecting the search results may be formed and stored in a metadata library 690. The description vector may include one value corresponding to each of the descriptive terms. The value $v_i$ for each element in the description vector may be calculated as follows:

$$v_i = \frac{\text{(number of documents containing descriptive term } i\text{)}}{\text{(number of documents downloaded)}}$$

Other methods of forming and/or normalizing the description vector may also be used.

At 664, the newly formed description vector may be compared to a previously stored version of the description vector for the same search term. At 666, a relative rate of change of the description vector may be determined. For example, the Euclidean distance between two successive versions of the description vector for the selected search term may be calculated. The rate of change may be quantized into two (for example, fast/slow change), three (for example, no/slow/fast change), or more levels.

At 668, the search repetition interval for the selected search term may be determined based, at least in part, on the rate of change of the description vector as determined at 666. The search repetition interval may be determine based, at least in part, on data received from one or more Web servers indicating the frequency of requests for information relating to the selected search term. For example, a search term associated with a rapidly-changing description vector and/or a high level of user interest evidenced by frequent requests for information may be assigned a relatively short search repetition interval, such as a portion of a day, a day or a few days, before being searched again. Conversely, a search term associated with a slowly-changing description vector and/or a low level of user interest evidenced by few requests for information may be assigned a relatively long search repetition interval, such as a week or a month, before being searched again. In the extreme case, a search term with no change in the associated description vector and no user requests for information may be removed temporarily or permanently from the search queue.

After the time interval for the next search of the selected search term is determined at 668, the search queue may be updated with the new time interval at 652, and the process 650 may repeat from 654 for the next search term. The search queue may also be updated at 652 to include new tracks discovered by a companion acoustic metadata server, such as the AMS 220. Newly discovered tracks may be placed at the top of the search queue and searched as soon as a server, search engine, or other search resource becomes available.

Figure 7:
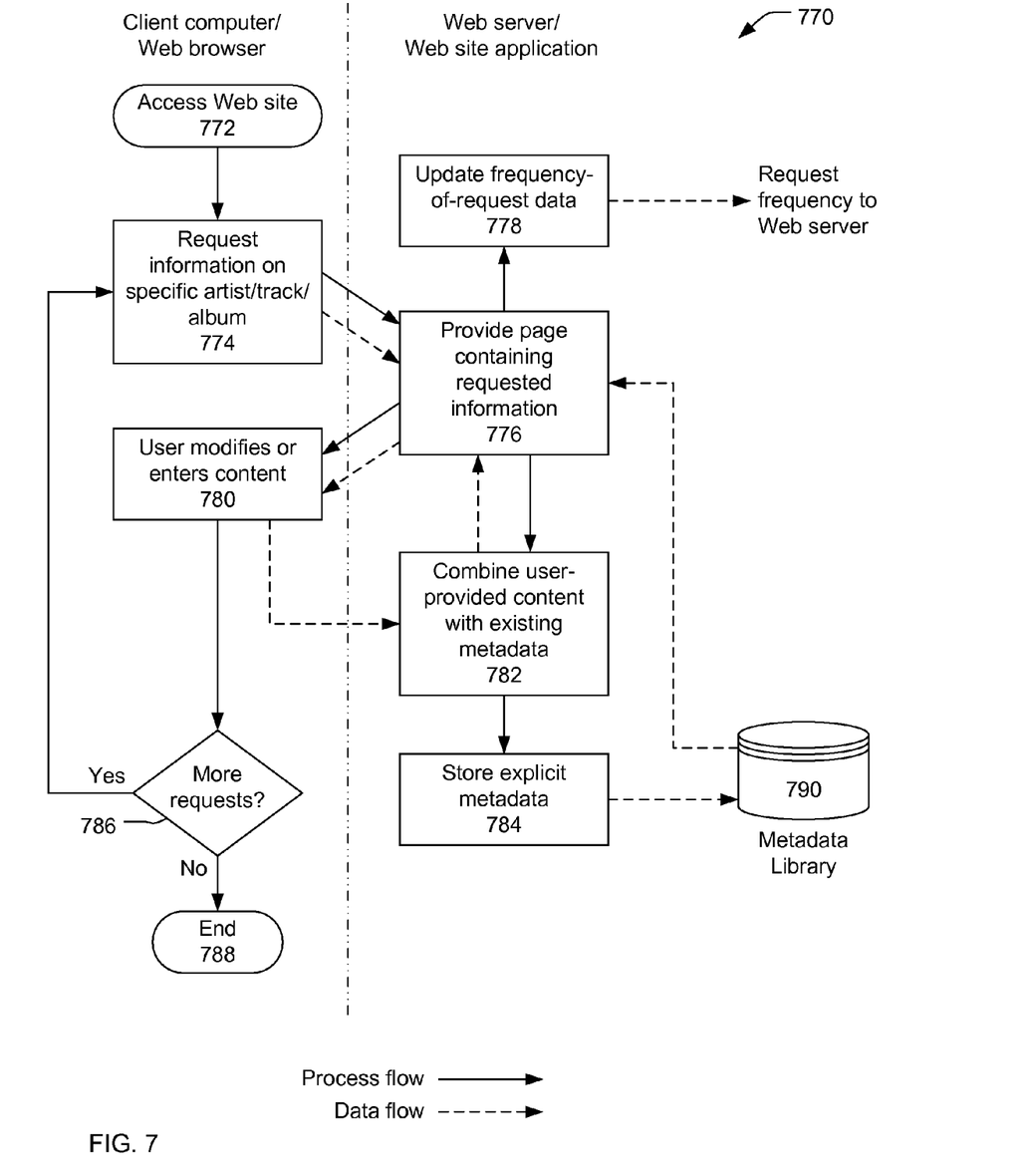
FIG. 7 is a flow chart of an exemplary process to automatically acquire explicit metadata.

Referring now to FIG. 7, a partially automatic process 770 acquiring acoustic metadata may be suitable for use at 470. The process 770 may be performed by a client computer running a web browser, which may be the client computer 210 and web browser 218, and a server running a web page application, which may be the Web server 270 and the Web page application 275.

The process 770 may acquire explicit metadata entered by user via client computers. The accumulation of the explicit metadata by the server may be automatic. The explicit metadata may also be entered manually by the users. Thus the process 770 may be considered to be partially automatic.

At 772 a user may access a music-related web site using the client computer and web browser. At 774, the user may request, in some manner, information relating to a specific artist, track, or album. The user may directly request information on the specific artist, track or album. The user may request other information, such as sales data or radio play data, which indirectly leads to information on the specific artist, track, or album.

The user's request may be transmitted to the server. In response to the request, the server may form and provide a web page containing the requested information at 776. The web page may incorporate explicit, cultural, and/or acoustic metadata stored within the server or retrieved from a metadata library 790, which may be the metadata library 290. At 778, the server may also maintain and update statistics of the number of requests for information related to the specific artist, album or track. The statistics may include total number of requests and the frequency of requests (per defined time interval) by artists, album, track, and/or combinations thereof.

At 780, while considering the web page provided by the server at 776, the user may modify or enter explicit metadata associated with the artist, album, or track by modifying the content of the web page. For example, when the user places the mouse over a field (such as the artist name, or the instruments, or the similar artists) a color space behind the text field may "light up" to indicate that the field is editable. The user may then click on the field to change the fixed text into an editable text box with the current text filled in. The user may then delete the text, change the contents of the text box, add additional text, or add text to a previously blank text field.

Changes to explicit metadata made by a user may be sent to the server. Any change a user makes may be immediately reflected in the web page as viewed by that user only. Any change a user makes may be combined with previously stored information as a weighted sum. Information submitted by new or unknown users may be given a fractional weight, for example 0.1, such that their votes do not count as much as experienced users who receive a weight of 1.0. Information from a presumed expert or trusted source, such as a record label or a metadata service, may receive even higher weight. In addition, system administrators may effectively ban or block apparently irresponsible or mischievous users by giving their entries much lower weights.

The web server and/or the metadata library may include a database of fields related to each artist, track, or album. For each field, the database may maintain a list of every different piece of information entered by users, along with a weighted sum for each piece of information. The database may also maintain a list of the identities of the users who entered each piece. A user returning to a web page that they previously modified may see the web page as they modified it. A new user, who has not entered any changes, may see the web page with the fields populated by the information having the highest weighted sum or "vote" for each piece of metadata. For example, if 100 people enter the instrument "vocal" for the artist "Madonna" and 30 people enter the instrument "synthesizer", a typical user will see "vocals" and only users that entered "synthesizer" will see "synthesizer".

A web page may include fields (such as "instrument," "mood," or "style") which may retain and show multiple values. For example, a field for "instruments" may present up to a system-defined maximum number of instruments such as, for example, ten instrument names. In this case, a new user may be presented with the names of the ten instruments that have the highest weighted sum. A field, such as artist name, may only show the information that has the highest weighted sum or was entered the most times.

At 784, the combined explicit metadata from 782 may be stored within the server or the metadata library 790.

At 786, the user by elect to continue to browse the music related web site, in which case the process may return to 774. At 786, the user may elect to leave the web site, in which case the process may end with respect to that user at 788.

Closing Comments

Throughout this patent, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method for building a music metadata library, comprising:
   automatically acquiring acoustic metadata and explicit metadata for one or more music tracks from a plurality of client computing devices
   automatically acquiring cultural metadata for the one or more music tracks by searching Internet-accessible content, automatically acquiring cultural metadata comprising:
      maintaining a search queue including a plurality of search terms and a search repetition interval associated with each search term
      searching for Internet-accessible content containing each of the plurality of search terms to acquire the cultural metadata
      repeating the searching and the storing for each of the plurality of search terms after the associated search repetition interval
      comparing the cultural metadata acquired by successive searches for each of the plurality of search terms to determine a rate of change of the cultural metadata for each search term
      determining the search repetition interval for each of the plurality of search terms based on, at least in part, the respective rate of change of the cultural metadata
   storing the acquired acoustic, explicit, and cultural metadata in the music metadata library.

2. The method of claim 1, wherein automatically acquiring acoustic and explicit metadata further comprises:
   receiving a unique identifier for a track stored in a first client computing device from the first client computing device
   determining if the track is a known track corresponding to acoustic metadata that is already contained in the music metadata library.

3. The method of claim 2, further comprising:
   when the track is not a known track
      receiving acoustic metadata for from the track from the first client computing device
      storing the received acoustic metadata in the music metadata library.

4. The method of claim 3, further comprising:
   receiving explicit metadata associated with the track from the first client computing device
   storing the received explicit metadata in the music metadata library.

5. The method of claim 4, further comprising:
   sending at least a portion of the explicit metadata to a cultural metadata server.

6. The method of claim 2, wherein
   the unique identifier is an acoustic fingerprint derived from the track by the first client computing device
   determining if the track is a known track comprises comparing the acoustic fingerprint to a plurality of acoustic fingerprints stored in the music metadata library.

7. The method of claim 2, further comprising:
   when the track is a known track
      retrieving acoustic metadata for the track from the music metadata library
      sending the retrieved acoustic metadata to the client computing device.

8. The method of claim 1, wherein acquiring cultural metadata further comprises for each search term:
   downloading the documents containing the search term
   forming a description vector for the search term based on the frequency that each of a predetermined plurality of descriptive terms is used in the downloaded documents.

9. The method of claim 8, wherein comparing the cultural metadata acquired by successive searches further comprises for each search term:
   comparing the description vector for the search term with a description vector formed from the results of a previous search for the same search term to determine a rate of change of the description vector for the search term.

10. The method of claim 1, further comprising:
   receiving explicit metadata for a new track not previously contained in the music metadata library
   adding the new track to the search queue
   conducting a search of the Internet to acquire cultural metadata for the new track.

11. The method of claim 1, further comprising:
   receiving request frequency data from a web server, the request frequency data indicating the frequency of user requests for information relating to at least some of the search terms
   determining the search repetition intervals associated with at least some of the search terms based, at least in part, on the request frequency data.

12. The method of claim 1, further comprising:
   acquiring user-entered explicit metadata via a web server
   combining the user-entered explicit metadata with explicit metadata previously stored in the music metadata library
   storing the combined explicit metadata in the music metadata library.

13. The method of claim 12, further comprising:
   assigning a weight factor to each of a plurality of users
   combining the explicit metadata entered by a specific user with explicit metadata previously stored in the music metadata library as a weighted sum using the weight factor for the specific user.

14. A method of automatically acquiring cultural metadata, comprising:
   maintaining a search queue including a plurality of search terms and a search repetition interval associated with each search term
   acquiring cultural metadata by conducting a search of the Internet for documents containing each of the plurality of search terms
   storing the acquired cultural metadata in a metadata library comparing the cultural metadata acquired by successive searches for each of the plurality of search terms to determine a rate of change of the cultural metadata for each search term determining the search repetition interval for each of the plurality of search terms based on, at least in part, the respective rate of change of the cultural metadata automatically repeating the acquiring and the storing for each of the plurality of search terms after the associated search repetition interval.

15. The method of claim 14, wherein acquiring cultural metadata further comprises:

for each search term
downloading the documents containing the search term
forming a description vector for the search term based on the frequency that each of a predetermined plurality of descriptive phrases is used in the downloaded documents.

16. The method of claim 15, wherein comparing the cultural metadata acquired by successive searches further comprises for each search term:

comparing the description vector for the search term with a description vector formed from the results of a previous search for the same search term to determine a rate of change of the description vector for the search term.

17. The method of claim 14, further comprising:

receiving explicit metadata for a new track not previously contained in the music metadata library
adding the new track to the search queue
immediately conducting a search of the Internet to acquire cultural metadata for the new track.

18. The method of claim 14, further comprising:

receiving request frequency data from a web server, the request frequency data indicating the frequency of user requests for information relating to at least some of the search terms
determining the search repetition intervals associated with at least some of the search terms based, at least in part, on the request frequency data.

19. A method for building a music metadata library, comprising:

automatically acquiring acoustic metadata and explicit metadata for one or more music tracks from a plurality of client computing devices automatically acquiring cultural metadata for the one or more music tracks by searching Internet-accessible content, automatically acquiring cultural metadata comprising:

maintaining a search queue including a plurality of search terms and a search repetition interval associated with each search term searching for Internet-accessible content containing each of the plurality of search terms to acquire the cultural metadata downloading the documents containing each of the plurality of search terms forming a description vector for each of the plurality of search terms based on the frequency that each of a predetermined plurality of descriptive terms is used in the downloaded documents comparing the description vector for each of the plurality of search terms with a description vector formed from the results of a previous search for the same search term to determine a rate of change of the description vector for the search term determining the search repetition interval for each of the plurality of search terms based on, at least in part, the rate of change of the respective description vector repeating the searching and the storing for each of the plurality of search terms after the associated search repetition interval storing the acquired acoustic, explicit, and cultural metadata in the music metadata library.

20. A method for building a music metadata library, comprising:

automatically acquiring acoustic metadata and explicit metadata for one or more music tracks from a plurality of client computing devices automatically acquiring cultural metadata for the one or more music tracks by searching Internet-accessible content, automatically acquiring cultural metadata comprising:

maintaining a search queue including a plurality of search terms and a search repetition interval associated with each search term searching for Internet-accessible content containing each of the plurality of search terms to acquire the cultural metadata receiving request frequency data from a web server, the request frequency data indicating the frequency of user requests for information relating to at least some of the plurality of search terms determining the search repetition intervals associated with at least some of the plurality of search terms based, at least in part, on the respective request frequency data repeating the searching and the storing for each of the plurality of search terms after the associated search repetition interval storing the acquired acoustic, explicit, and cultural metadata in the music metadata library.

21. A method of automatically acquiring cultural metadata, comprising:

maintaining a search queue including a plurality of search terms and a search repetition interval associated with each search term acquiring cultural metadata by conducting a search of the Internet for documents containing each of the plurality of search terms downloading the documents containing each of the plurality of search terms storing the acquired cultural metadata in a metadata library forming a description vector for each of the plurality of search terms based on the frequency that each of a predetermined plurality of descriptive phrases is used in the respective downloaded documents comparing the description vector for each of the plurality of search terms with a description vector formed from the results of a previous search for the same search term to determine a rate of change of the description vector for the search term determining the search repetition interval for each of the plurality of search terms based on, at least in part, the rate of change of the respective description vector automatically repeating the acquiring and the storing for each of the plurality of search terms after the associated search repetition interval.

22. A method of automatically acquiring cultural metadata, comprising:

maintaining a search queue including a plurality of search terms and a search repetition interval associated with each search term acquiring cultural metadata by conducting a search of the Internet for documents containing each of the plurality of search terms storing the acquired cultural metadata in a metadata library receiving request frequency data from a web server, the request frequency data indicating the frequency of user requests for information relating to at least some of the plurality of search terms determining the search repetition intervals associated with at least some of the plurality of search terms based, at least in part, on the respective request frequency data automatically repeating the acquiring and the storing for each of the plurality of search terms after the associated search repetition interval.

* * * * *